US011431635B2

(12) United States Patent
Basavaraj et al.

(10) Patent No.: US 11,431,635 B2
(45) Date of Patent: Aug. 30, 2022

(54) LOAD BALANCING DESIGNATED ROUTERS FOR MULTICAST GROUPS

(71) Applicant: VMware, Inc., Palo Alto, CA (US)

(72) Inventors: Vijayalaxmi Basavaraj, Cupertino, CA (US); Ankur Dubey, Santa Clara, CA (US); Sami Boutros, Union City, CA (US)

(73) Assignee: VMWARE, INC., Palo Alto, CA (US)

( * ) Notice: Subject to any disclaimer, the term of this patent is extended or adjusted under 35 U.S.C. 154(b) by 60 days.

(21) Appl. No.: 16/813,691

(22) Filed: Mar. 9, 2020

(65) Prior Publication Data

US 2021/0281515 A1    Sep. 9, 2021

(51) Int. Cl.
*H04L 47/125* (2022.01)
*H04L 12/66* (2006.01)
*H04L 12/18* (2006.01)

(52) U.S. Cl.
CPC ............ *H04L 47/125* (2013.01); *H04L 12/18* (2013.01); *H04L 12/66* (2013.01)

(58) Field of Classification Search
CPC ....... H04L 47/125; H04L 47/15; H04L 12/18; H04L 12/4641; H04L 12/4633; H04L 12/185; H04L 12/1886; H04L 12/4625; H04L 12/44; H04L 12/462; H04L 12/46; H04L 12/4662; H04L 12/4679; H04L 12/66; H04L 45/16; H04L 45/02; H04L 45/04; H04L 45/50; H04L 45/48; H04L 45/586; H04L 45/64; H04L 45/74; H04L 45/021; H04L 45/72; H04L 45/54; H04L 45/44; H04L 45/741; H04L 45/742; H04L 45/7453

See application file for complete search history.

(56) References Cited

U.S. PATENT DOCUMENTS

| | | | | |
|---|---|---|---|---|
| 8,094,602 | B2 * | 1/2012 | Gutierrez | H04L 12/185 370/312 |
| 9,014,007 | B2 * | 4/2015 | Bhikkaji | H04L 12/189 370/237 |
| 9,071,546 | B2 * | 6/2015 | Cai | H04L 45/16 |
| 2006/0268869 | A1 * | 11/2006 | Boers | H04L 45/00 370/390 |

(Continued)

FOREIGN PATENT DOCUMENTS

CN    104468147 B    5/2018

*Primary Examiner* — Glenton B Burgess
*Assistant Examiner* — Rachel J Hackenberg
(74) *Attorney, Agent, or Firm* — Adeli LLP

(57) ABSTRACT

Some embodiments provide a method for a host computer that executes a set of data compute nodes (DCNs), for identifying a designated router for a multicast group. The method receives a membership request message to join the multicast group from a particular DCN of the set of DCNs, the membership request message including an address associated with the multicast group. The method identifies a logical router gateway from a set of logical router gateways as the designated router for the multicast group, based at least in part on the address associated with the multicast group, where different logical router gateways from the set of logical router gateways are assigned as designated routers for different multicast groups with different associated addresses. The method forwards the membership request message to the identified logical router gateway.

19 Claims, 9 Drawing Sheets

(56) References Cited

U.S. PATENT DOCUMENTS

| | | | |
|---|---|---|---|
| 2006/0268871 A1* | 11/2006 | Van Zijst | H04N 21/2383 370/390 |
| 2014/0192804 A1* | 7/2014 | Ghanwani | G06F 9/45558 718/1 |
| 2018/0375799 A1* | 12/2018 | Liu | H04L 12/1886 |
| 2019/0020490 A1* | 1/2019 | Boutros | H04L 12/1886 |

* cited by examiner

LOAD BALANCING DESIGNATED ROUTERS FOR MULTICAST GROUPS

BACKGROUND

In a traditional network, load sharing or equal-cost multi-path (ECMP) routing does not exist for multicast groups on an L2 network. Multiple routers on a layer 2 (L2) segment may receive the multicast group join notification from the hosts. In a unicast ECMP routing environment, external routers may have different ECMP paths to the L2 network via multiple edge gateway routers, but in multicast routing, only one of these paths gets utilized for multicast traffic. This happens via election of one of the gateways as a designated router for the L2 network, which forwards all multicast traffic directed to receivers in an attached L2 segment. Typically, the router with the highest IP address gets elected as the designated router, and as a result the available bandwidth via the other routers is not utilized. For every multicast group sending traffic to the segment, the designated router for the segment sends a join request to a rendezvous point router associated with the multicast group, so that all of the multicast traffic from the shared tree of the rendezvous point is only received by that designated router. Solutions to this problem have been proposed to share the duty of forwarding multicast traffic for different groups from the edge to the receiving nodes, by assigning different groups to different edge gateways. However, even with these solutions, all of the edge gateways still must join all of the multicast groups sending traffic to the segment, and thus receive copies of all of the multicast traffic from every group. This results in duplicated incoming data at the network edge and wasted bandwidth.

BRIEF SUMMARY

Some embodiments of the invention provide a novel method for assigning designated routers for multicast groups in a datacenter such that different multicast groups are assigned to different designated routers, in order to load balance the multicast traffic between the different designated routers. In some embodiments, the method selects the between multiple candidate logical router gateways that process data messages (both unicast and multicast) between the logical network and an external network and are available to act as designated routers for the multicast groups.

In some embodiments, a forwarding element performs the designated router selection upon receiving a membership request message from a data computer node (DCN) requesting to join a particular multicast group. The forwarding element (e.g., a managed forwarding element executing on a host computer along with the DCN) uses a load-balancing technique to identify which of the candidate logical router gateways is the designated router for the multicast group, and forwards the membership request message to that identified logical router gateway. Based on receiving the membership request message, the logical router gateway sends a join request message to a distribution router (e.g., a rendezvous point) in the external network associated with the multicast group.

Once the DCN has joined the multicast group (via the designated logical router gateway), multicast traffic flows from the external network to the DCN (and vice versa). Multicast traffic from the external network is only be sent to the designated logical router gateway for the particular multicast group, rather than all of the candidate logical router gateways, because only that candidate gateway will have sent the join message to the distribution router in the external network. Similarly, traffic for other multicast groups is only be sent to the corresponding designated logical router gateways for those other multicast groups. This balances the traffic across the gateways, rather than either (i) all of the multicast traffic being sent to all of the candidate logical router gateways or (ii) all of the multicast traffic for all groups being sent to a single designated logical router gateway.

Upon receipt of traffic for a particular multicast group, the designated logical router gateway for that group forwards the traffic to all of the host computers hosting DCNs that have joined the group (e.g., by storing a list of these host computers for each of the multicast groups for which the logical router gateway is the designated router). Each logical router gateway, in some embodiments, has at least one interface on which that gateway receives messages from and sends messages to the logical network. The logical router gateways store associations between the interface on which a membership request message was received and the multicast group identified by that membership request message, and use this interface for forwarding multicast data messages to the logical network by referencing the stored association.

The forwarding elements at the host computers receive data messages for the multicast group (i.e., directed to the multicast address associated with the group) from the designated logical router gateway, and forward these data messages to their respective DCN(s) for the group. Some embodiments store associations between DCNs and the multicast groups based on the membership request messages and forward the data messages to the DCNs by referencing these stored associations. In some embodiments, multiple DCNs on the same or different host computers can join the same multicast group or different groups, one DCN can join multiple multicast groups (which may have the same or different designated logical router gateways), etc., and all of these associations are stored by the forwarding elements on their respective host computers.

The load-balancing technique used to identify the designated logical router gateway for a particular multicast group, in some embodiments, uses the multicast group address for that particular multicast group. Specifically, some embodiments calculate a value based on the multicast address and use that calculated value to identify one of the available candidate logical router gateways. Each of the logical router gateways is assigned a different rank in some embodiments (e.g., by a network management and control system), and the logical router gateway having an assigned rank equal to the calculated value is identified as the designated router. In some embodiments, the forwarding element calculates the value by computing a portion of the multicast group address (e.g., the last eight bits) modulo the number of logical router gateways that are currently available to receive data messages from the external network.

In some cases, the number of available logical router gateways changes because a gateway has gone down, a new gateway has been added, and/or a gateway that had previously gone down has come back up. When one of the gateways goes down, all of the multicast groups for which that gateway is the designated router have to move to new logical router gateways. Based on new ranks assigned by the network management and control system, the forwarding elements on the host computers can recalculate the designated logical router gateways for multicast groups that were previously assigned to any logical router gateways that are no longer available (and use the new ranks for any subsequent membership requests).

In some embodiments, when the number of currently available logical router gateways changes, each designated router also performs the recalculation to determine whether to remain the designated router for assigned multicast groups or whether it has been assigned as the designated router for a different multicast group. Each designated router then sends additional join request messages or cancel request messages to the appropriate distribution routers (i.e., rendezvous points associated with the affected multicast groups) as needed based on these determinations.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for assigning designated routers for multicast groups in a datacenter such that different multicast groups are assigned to different designated routers, in order to load balance the multicast traffic between the different designated routers. In some embodiments, the method selects between multiple candidate routers that process data messages (both unicast and multicast) between the logical network and an external network and are available to act as designated routers for the multicast groups.

Figure 1:
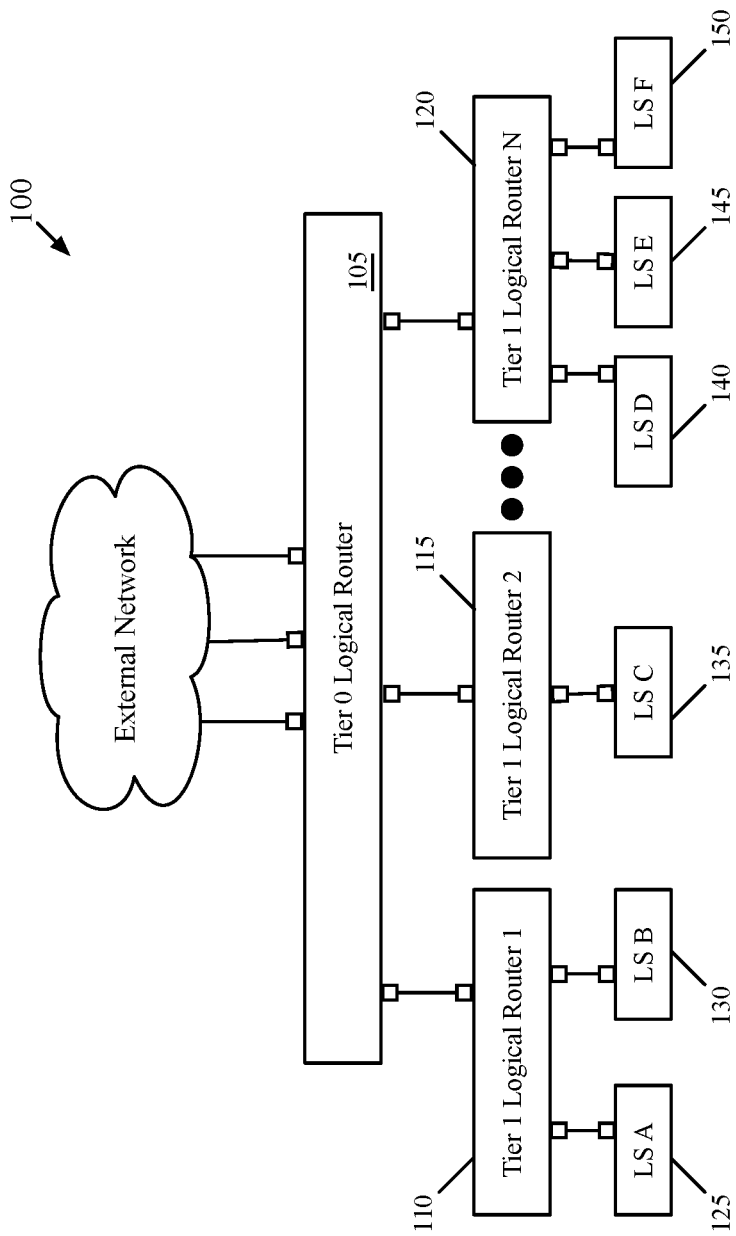
FIG. 1 conceptually illustrates a logical network architecture with multiple tenant logical networks.

FIG. 1 conceptually illustrates a logical network architecture 100 with multiple tenant logical networks. In some embodiments, a logical network is a conceptualization of a network (e.g., for a datacenter tenant) that is defined by a network administrator. Such logical networks may include logical forwarding elements (e.g., logical routers, logical switches) as well as various other logical network entities (e.g., firewalls, load balancers, etc.). In the physical network (e.g., a datacenter network), these logical networks are implemented by various physical forwarding elements (e.g., software forwarding elements such as virtual switches, hardware forwarding elements such as top-of-rack switches, etc.), such that data messages sent by logical network endpoints (e.g., virtual machines or other data compute nodes) are processed as though sent through a physical network with the structure of the logical network. This architecture allows for many logical networks to be implemented (e.g., as overlay networks) by the physical network elements. That is, a single software switch might implement many logical networks for many different tenants.

As shown, the logical network architecture 100 includes at least one Tier 0 logical router 105 that provides access to external networks. The Tier 0 (T0) logical routers are also referred to as provider logical routers (PLRs) in some embodiments, because these are often configured by the datacenter administrator. In addition, multiple Tier 1 (T1) logical routers 110-120 connect to the T0 router 105, and logical switches 125-150 each connect to one of these Tier 1 routers 110-120. The Tier 1 logical routers are referred to as tenant logical routers (TLRs) in some embodiments, since the tenant is often responsible for configuring them. There may be additional tiers of logical routers below Tier 1 (e.g., for datacenters with a very large number of tenants or tenants with very large networks, as well as for logical networks that span multiple datacenters). In addition, various logical network endpoints such as virtual machines (VMs), containers, physical computing devices, or other data compute nodes (DCNs) may be attached to the logical switches.

In some embodiments, each T1 router is configured by a different datacenter tenant (e.g., via an application that only allows the tenant to manage their own logical network), while the T0 router is configured by a datacenter administrator (e.g., a cloud provider). Each of the tenants also configures the logical switches that connect to their respective T1 routers. In some embodiments, any number of T1 routers may be attached to a T0 router such as the T0 router 105. Some datacenters may have only a single T0 router to which all T1 routers implemented in the datacenter attach, whereas other datacenters may have numerous T0 routers. For instance, a large datacenter may want to use different T0 router policies for different tenants, or may have too many different tenants to attach all of the T1 routers to a single T0 router. Part of the routing table for a T0 router includes routes for all of the logical switch domains of its T1 routers, so attaching numerous T1 routers to a T0 router creates several routes for each T1 router just based on the subnets attached to the T1 router.

A network management and control system (not shown) of some embodiments (e.g., a set of network controller applications and/or network management applications) is responsible for receiving the logical network configurations from the tenants, generating configuration data for allowing the various physical network elements to implement the logical networks, and distributing this data to these physical network elements. In some embodiments, the network management and control system receives configuration data for a T1 router from a network administrator and defines multiple routing components for the logical router. For instance, some embodiments define a distributed routing component (DR) and one or more centralized routing components (also referred to as service routers, service routing components, or SRs), each of which has a separate routing table and separate set of interfaces. In addition, the network management and control system defines transit logical switches for logically switching data messages between the routing components in some embodiments, as well as between the T1 routers and the T0 routers.

For instance, the network management and control system of some embodiments would receive configuration data for the T1 router 110, and generate a DR and two SRs (one active and one standby). In addition, the network management and control system would generate a first transit logical switch to connect these routing components and a second transit logical switch to connect the T1 router 110 to the T0 router 105. Further discussion of the different routing components and transit logical switches of some embodiments can be found in U.S. Pat. No. 9,787,605, which is incorporated herein by reference.

The DRs and logical switches are implemented in a distributed manner in some embodiments. That is, a single DR or logical switch is implemented by many different physical forwarding elements. For instance, a virtual switch or a set of virtual switch and virtual router modules executing on a host computer that hosts a DCN connected to logical switch 125 might implement at least logical switches 125 and 130 as well as the DR for T1 router 110 (and the transit logical switch internal to the implementation of T1 router 110).

Each SR, on the other hand, is implemented on a single physical computer in some embodiments. Such a physical computer might implement multiple SRs, as well as the various DRs and logical switches. For instance, some embodiments designate gateway devices for implementing the SRs of the T1 routers, as well as the SRs of the T0 routers. In some embodiments, these gateway devices implement a gateway datapath (e.g., using the data plane development kit (DPDK), a set of libraries and network interface controller (NIC) drivers for packet processing) that performs the data message processing for the SRs (as well as the distributed network entities of the logical networks).

Figure 2:
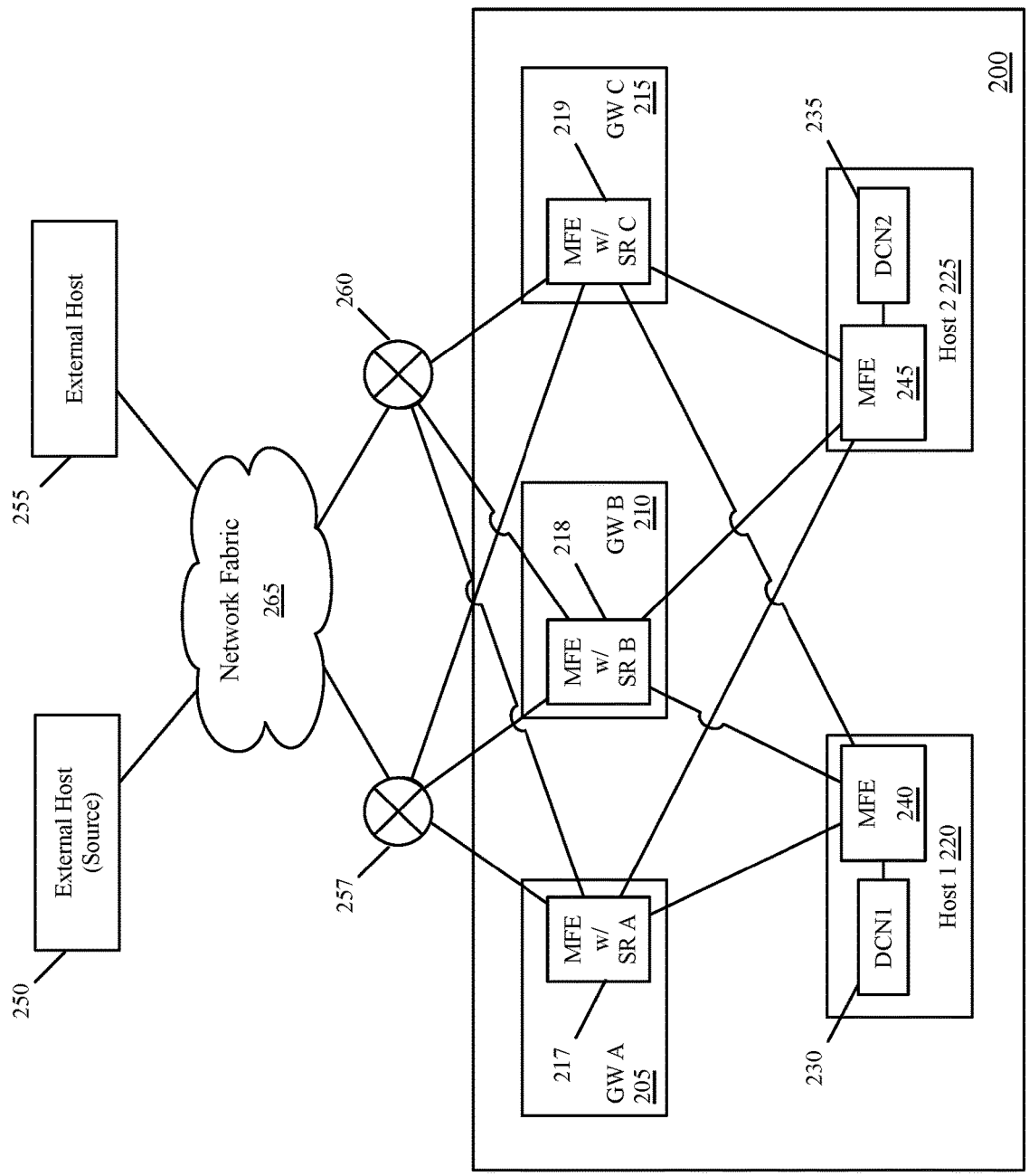
FIG. 2 conceptually illustrates a physical implementation of the logical network in FIG. 1, that exchanges data messages with an external network.

FIG. 2 conceptually illustrates an example of a physical implementation of the logical network 100 in FIG. 1, that exchanges data messages (e.g., packets) with an external network. In some embodiments the logical network is a tenant logical network in a datacenter 200, with a group of edge gateways 205-215 providing connectivity to an external network. Each gateway 205-215 executes an MFE, which implements at least one SR as well as other logical network components (not shown) in some embodiments such as distributed routers (DRs), T1 routers and T0 routers, and logical switches. The SRs may be implemented in the same datapath as the other logical network components, or separately from the MFE (e.g., as a virtual machine, a namespace or other container, as a VRF, etc.) in different embodiments. Some embodiments assign different SRs as designated routers for different multicast groups, as will be discussed in further detail below.

As shown, host computers 220-225 that each host one or more logical network DCNs 230-235 connect (through the physical network of the datacenter 200) to the gateways 205-215. Managed forwarding elements (MFEs) 240-245 executing on the host computers 220-225 perform logical and physical processing operations (e.g., encapsulation and decapsulation) to forward traffic to and from the DCNs 230-235. The MFEs on the host computers execute logical network components (not shown) in some embodiments, such as distributed routers (DRs), T1 routers and T0 routers, and logical switches. When the logical network DCNs 230-235 exchange data traffic with each other, the traffic remains within the logical network (e.g., processed by the internal logical switches 125-150, T1 routers 110-120 and T0 routers 105). When the logical network DCNs 230-235 exchange traffic with external endpoints (e.g., DCNs executing on external hosts 250-255), the traffic is transmitted through the gateways 205-215.

To provide an example, DCN2 235 could have a unicast network address of 10.1.1.1 and also request to join multicast group 225.1.1.1. For the unicast prefix 10.1.1.1, there are multiple equal-cost multipath (ECMP) routing paths from external hosts 250-255 (which are potential sources of traffic) to DCN2 235, via the routers 257-260 in the external network and service routers (SRs) in the logical network executing on the gateways 205-215. However, multicast traffic is not forwarded directly to the receiver DCNs. All multicast traffic from external hosts 250-255 intended for receivers in the logical network 100 must be forwarded (e.g., using unicast) only to whichever SR was assigned as the designated router using an election process. This election process, which in some embodiments of the invention is based on the multicast group address, is described in further detail below with reference to FIG. 3 and FIG. 7.

Once elected, the designated router is responsible for distributing multicast traffic received from the source host or via the rendezvous point (RP) router for that multicast group, to the DCNs in the logical network that have requested to join the multicast group. Unlike unicast traffic, which is typically encapsulated with a tunnel header that specifies the source and destination addresses of the data to be delivered, multicast traffic is transmitted by the designated router out of a southbound interface that faces the logical network. The forwarding elements that receive the multicast traffic determine whether to process or drop that traffic, as described in further detail with reference to FIG. 8 below.

In some embodiments, multicast groups may span more than one T1 router. In other words, a multicast group may have members in different logical domains. For example, in FIG. 1 a multicast group may include machines attached to logical switches 125 and 130 which are part of the domain of T1 router 110, as well as machines attached to logical switch 135 which is part of the domain of T1 router 115. In some embodiments, these different domains correspond to different logical subnets of the logical network. For multicast groups that span more than one T1 router or logical domain, there is still only a single designated router for that multicast group.

As discussed above, service routers (SRs) are candidates for election in some embodiments as designated routers for multicast traffic. In some embodiments, different designated routers are elected for different multicast groups as a load-balancing technique. Some embodiments modify the election algorithm to be based on the multicast prefix address in addition to the interface IP addresses of the candidate routers. Specifically, in some embodiments the forwarding elements that implement the logical network calculate a load-balancing value based on the multicast address and use that calculated load-balancing value to identify one of the available candidate routers. Each candidate router is assigned a different rank in some embodiments (e.g., automatically generated by a network management and control system), and whichever candidate router has an assigned rank equal to the calculated value for a multicast group is assigned as the designated router for that multicast group. The router rank is contiguous, and in some embodiments ranges from zero to N-1, where N is the maximum number of candidate routers that are available for election as designated routers.

In some embodiments, the forwarding element calculates the load-balancing value based on a portion of the multicast group address modulo the number N of candidate routers that are currently available to receive data messages from the external network:

$$(\text{load-balancing value}) = (\text{portion of multicast group address}) \% (N) \quad (1)$$

For example, if the multicast group address is an IPv4 address in the reserved block of addresses defined in RFC 5771 (March 2010), then some embodiments use the last octet (eight bits) of the address. If the multicast group address is an IPv6 address in the older format as defined in RFC 2373 (July 1998), then some embodiments use the last 112 bits of the address. If the multicast group address is an IPv6 address in the newer format as defined in RFC 7371 (September 2014), then some embodiments use the last 32 bits of the address. RFCs 5771, 2373, and 7371 are incorporated herein by reference. The portion of the multicast group address may be modified or optimized based on how many multicast groups and how many available candidate routers there are, as well as scalability requirements for the logical network.

Continuing the example above, in FIG. 2 the SRs A-C 217-219 executing on gateways 205-215 might have IPv4 addresses 20.1.1.1, 20.1.1.2, and 20.1.1.3, respectively, with the multicast group address being 225.1.1.1. Without taking the multicast prefix into account, all multicast traffic for all multicast groups 225.1.1.{0-255} would only be routed through SR C 219, since that SR has the highest IP address. Instead, using equation (1) above, the election of designated routers for different multicast groups is distributed equally among all the available candidate routers 217-219.

Figure 3:
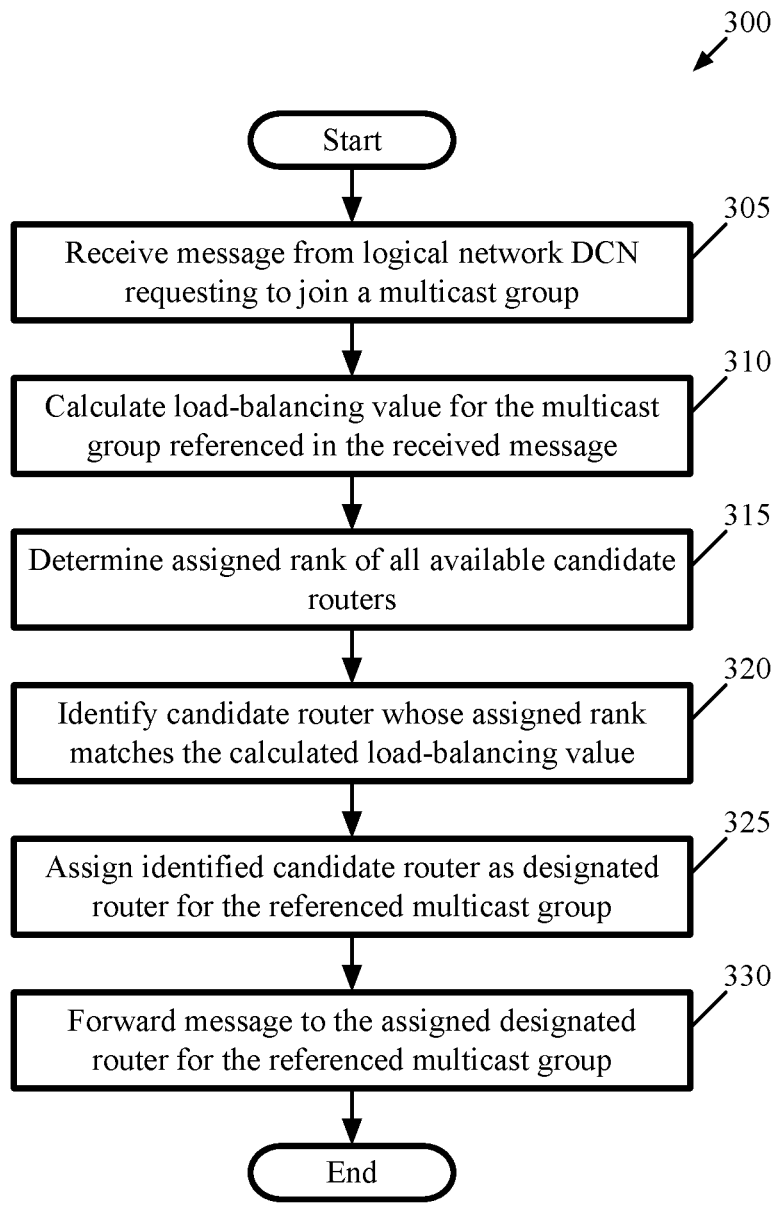
FIG. 3 conceptually illustrates a process for selecting one candidate router from several available candidate routers as a designated router for a multicast group.
Figure 4:
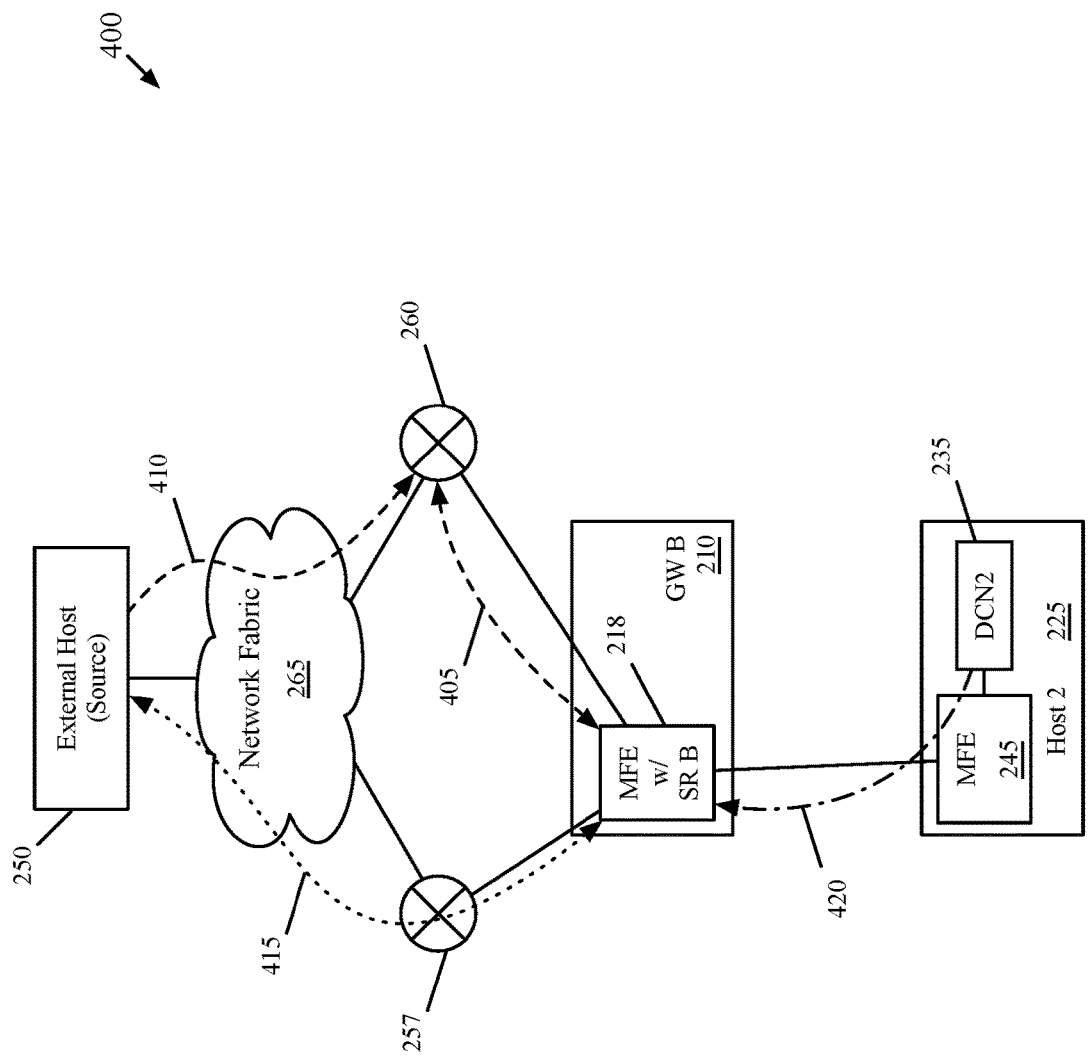
FIG. 4 conceptually illustrates a simplified view of the physical implementation of the logical network shown in FIG. 2, in order to highlight the paths of multicast-specific request and data messages.

FIG. 3 conceptually illustrates a process 300 for selecting one candidate router from several available candidate routers as a designated router for a multicast group. In some embodiments, the process 300 is performed by a forwarding element, such as a managed forwarding element (MFE) executing on a host computer that executes at least one logical endpoint (e.g., a DCN) for the logical network that needs to receive multicast traffic from the external network. For example, in FIG. 2, the process 300 is performed by MFE 245 executing on host 225, that routes multicast traffic to and from DCN2 235. FIG. 4 illustrates a simplified view of a portion of the physical implementation of the logical network 100, in order to highlight the paths of the multicast-specific requests and data messages.

The process 300 begins at 305 upon receiving an membership request message from a logical network DCN requesting to join the multicast group as a receiver DCN. This membership request message is an Internet Group Management Protocol (IGMP) message in some embodiments, that includes the multicast group's address. For example, in the example described above, DCN2 235 sends an IGMP message referencing multicast group 225.1.1.1 to MFE 245.

At 310, the process 300 calculates a load-balancing value for the referenced multicast group, using Equation (1) above. As discussed above with reference to the example of FIG. 2, the load-balancing value is calculated using the multicast group address (which is referenced in the IGMP message) and the number N of available candidate routers. In some embodiments, N is determined by the process 300 using state information stored by the forwarding element, which is based on information provided by the network management and control system, as well as other multicast control messages being broadcast over the segment from other DCNs, hosts, and designated routers. In the example of FIG. 2, there are three available candidate routers 217-219, so accordingly N=3.

At 315, the process 300 determines the assigned rank of all available candidate routers. As discussed above, the assigned rank is provided by the network management and control system. In the example of FIG. 2, SR A 217 has rank 0, SR B 218 has rank 1, and SR C 219 has rank 2. In some embodiments, the assigned rank is at least part of the state information that is used to determine N for calculating the load-balancing value, as discussed above regarding operation 310.

At 320, the process 300 identifies which candidate router whose assigned rank matches the calculated load-balancing value. For example in FIG. 2, the load-balancing value calculated using Equation (1) is equal to 1 (e.g., 1% 3=1). This value matches the rank of SR B 218, and does not match the rank of SR A 217 or SR C 219. Therefore, SR B 218 is identified as the designated router for multicast group 225.1.1.1.

The process 300 assigns (at 325) the identified candidate router as the designated router for the multicast group that was referenced in the received membership request message. The process 300 forwards (at 330) the membership request message to the assigned designated router, for example by encapsulating the membership request message with a header that specifies the IP address of the assigned router as a destination address. Based on receiving this message, the designated router sends a join request message to the rendezvous point in the external network associated with the referenced multicast group. The process 300 then ends.

In the example, the membership request message is encapsulated by the MFE 245 with destination address 20.1.1.2. The encapsulated message is received by the MFE 218 at gateway B 210, and this MFE decapsulates the message and provides it to SR B for logical processing. The physical path 280 of the membership request message for multicast group 225.1.1.1, as determined by MFE 245 executing process 300, is illustrated by a dashed-dotted line, from DCN2 235 to the MFE 218 on gateway B 210.

The process 300 is not performed by a forwarding element every time a membership request message is received from a DCN. Some embodiments store or cache the election of the designated router as state information for future reference. Future membership request messages from other DCNs that request to join the same multicast group are then forwarded directly to the designated router for that group based on that state information instead of repeating the calculation. In other words, the process 300 may omit operations 310-325 if a valid designated router is already assigned for that multicast group.

Moreover, in some embodiments the process 300 is repeated for a multicast group after a timeout period, regardless of whether a designated router has already been assigned for that multicast group. This is to ensure that changes in the availability of the candidate routers or modifications to the configuration of the logical network are properly and automatically reflected in the selection of the designated router, and that multicast traffic is routed correctly.

Once the DCN 235 has joined the multicast group (via the designated router 218), multicast traffic will flow from the external network to the DCN (and vice versa). Multicast traffic from the external network will only be sent to the designated router (e.g., SR B 218) for the particular multicast group, rather than all of the candidate routers 217-219, because only that candidate router has sent the join message to the distribution router in the external network. Similarly, traffic for other multicast groups will only be sent to the corresponding designated routers assigned to those other multicast groups. This balances the multicast traffic across the gateways, rather than either (i) all of the multicast traffic being sent to all of the candidate gateways 205-215 or (ii) all of the multicast traffic for all groups being sent to a single gateway.

Upon receipt of traffic for a particular multicast group, the designated router for that group forwards the traffic to all of the host computers 220-225 hosting DCNs in the logical network that have joined the group (e.g., by storing a list of these host computers for each of the multicast groups for which the SR is the designated router). Each SR in some embodiments has at least one interface on which that SR receives messages from and sends messages to the logical network. The SRs store associations between the interface on which a membership request message was received and the multicast group identified by that membership request message, and use this interface for forwarding multicast data messages to the logical network 100 by referencing the stored association.

Figure 5:
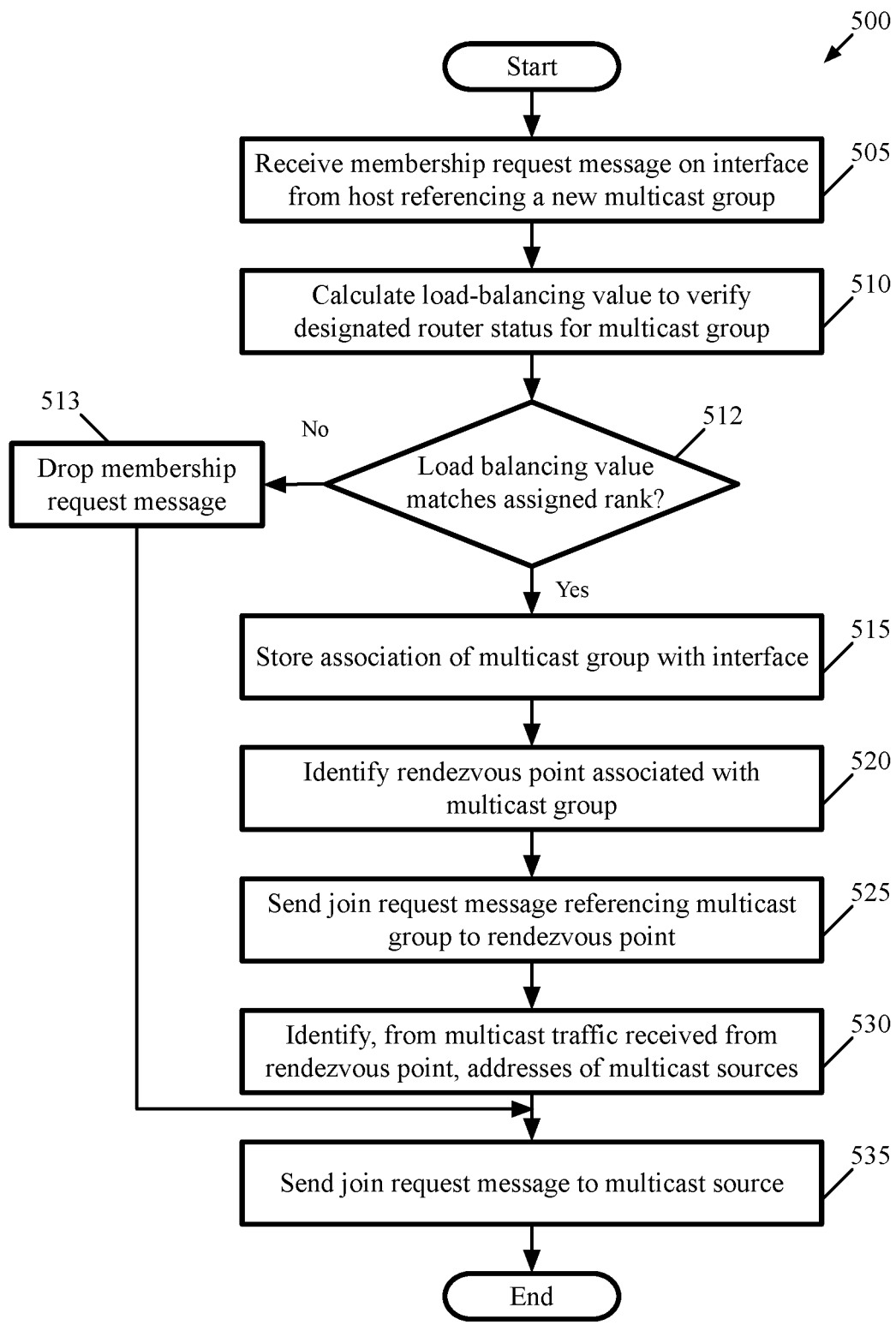
FIG. 5 conceptually illustrates a process performed by a service router (SR) after being elected as a designated router for a new multicast group.

FIG. 5 conceptually illustrates a process 500 performed in some embodiments by an SR after being elected as a designated router for a new multicast group. FIG. 5 is also discussed in part by reference to FIG. 4. The process 500 begins at 505 by receiving a membership request message for a multicast group, on an interface that faces the logical network 100. As discussed above with reference to FIG. 3, the membership request message is sent to the SR in some embodiments from a host computer that executes a DCN which requests membership in a multicast group, and that performs the election to select the SR as the designated router for that multicast group.

The process 500 calculates (at 510) the load-balancing value in some embodiments using Equation (1), as a validation operation to verify that the SR is indeed the correct designated router for the multicast group referenced in the membership request message. At 512, the process determines whether the calculated load-balancing value matches the SR's assigned rank. If the calculated value does not match, then another peer SR is the correct designated router for this multicast group. The process 500 proceeds to 513 and drops the membership request message. The process 500 then ends.

The process 500 omits these verification operations in some embodiments. If the calculated load-balancing value does indeed match, or if the verification operations 510 and 512 are omitted, the process 500 stores (at 515) an association of the multicast group with the interface on which the membership request message was received. This association is a state for the SR, which keeps track of to which multicast groups it has been assigned as a designated router. The association is stored in some embodiments using a multicast group identifier and an interface identifier. Some embodiments also utilize this state when forwarding multicast traffic to the logical network, as discussed below with reference to FIG. 6.

The process 500 also identifies (at 520) which rendezvous point (RP) router is associated with the multicast group. Some embodiments provide the address of the RP for the multicast group to the designated router from the network management and control plane. Any router in the external network may serve as an RP for a multicast group, including routers at the edge of the external network such as Top-of-Rack (ToR) switches, or other routers in the network fabric.

The process 500 sends (at 525) a join request message towards the identified RP. In some embodiments, the join request message is a Protocol-Independent Multicast (PIM) join message (*,G), as described in RFC 4601 (February 2006), which is incorporated herein by reference. In the example of FIG. 4, for multicast group 225.1.1.1, SR B 218 executing on gateway B 210 has been elected as the designated router, and the external router 260 is the associated RP. The physical path 405 of the PIM join (*,G) message that the designated router 218 sends to the RP 260 is illustrated in FIG. 4 by a dashed line.

Upon sending the join request to the RP, the SR begins to receive multicast traffic addressed to the multicast group. Since the sources of the multicast traffic (e.g., host 250) are unaware of the existence of the designated router, the sources forward all multicast traffic for the multicast group 225.1.1.1 to the assigned RP 260. The physical path 410 of the multicast traffic from the source host 250 to the RP 260 is illustrated in the example of FIG. 4 by another dashed line. As a result of sending the PIM (*,G) join message, all traffic for the multicast group from the source host 250 is initially received by the designated router only via the RP 260 along physical paths 410 and 405.

From the received multicast traffic, the process 500 identifies (at 530) an address of a multicast source (e.g., the address of external host 250). At 535, the process 500 also sends a join request message to these sources. The join request message is a PIM (S,G) join message in some embodiments, and is forwarded along the best available path, which may not include the RP 260. The physical path 415 along which the designated router sends the PIM (S,G) message to the source host 250 is illustrated by a dotted line.

As a result of receiving this PIM (S,G) join request message, the source learns of the existence of the designated router, and begins to forward multicast traffic (e.g., using unicast) for the multicast group to the designated router via the same path 415. The external network host 250 and routers 257-260 are connected by an intervening network fabric 265, providing potentially many paths for multicast traffic from the external host to reach the gateways 205-215 where the SRs execute. The process 500 then ends. In some embodiments, the SR performs the process 500 for every multicast group for which it has been elected as the designated router.

Figure 6:
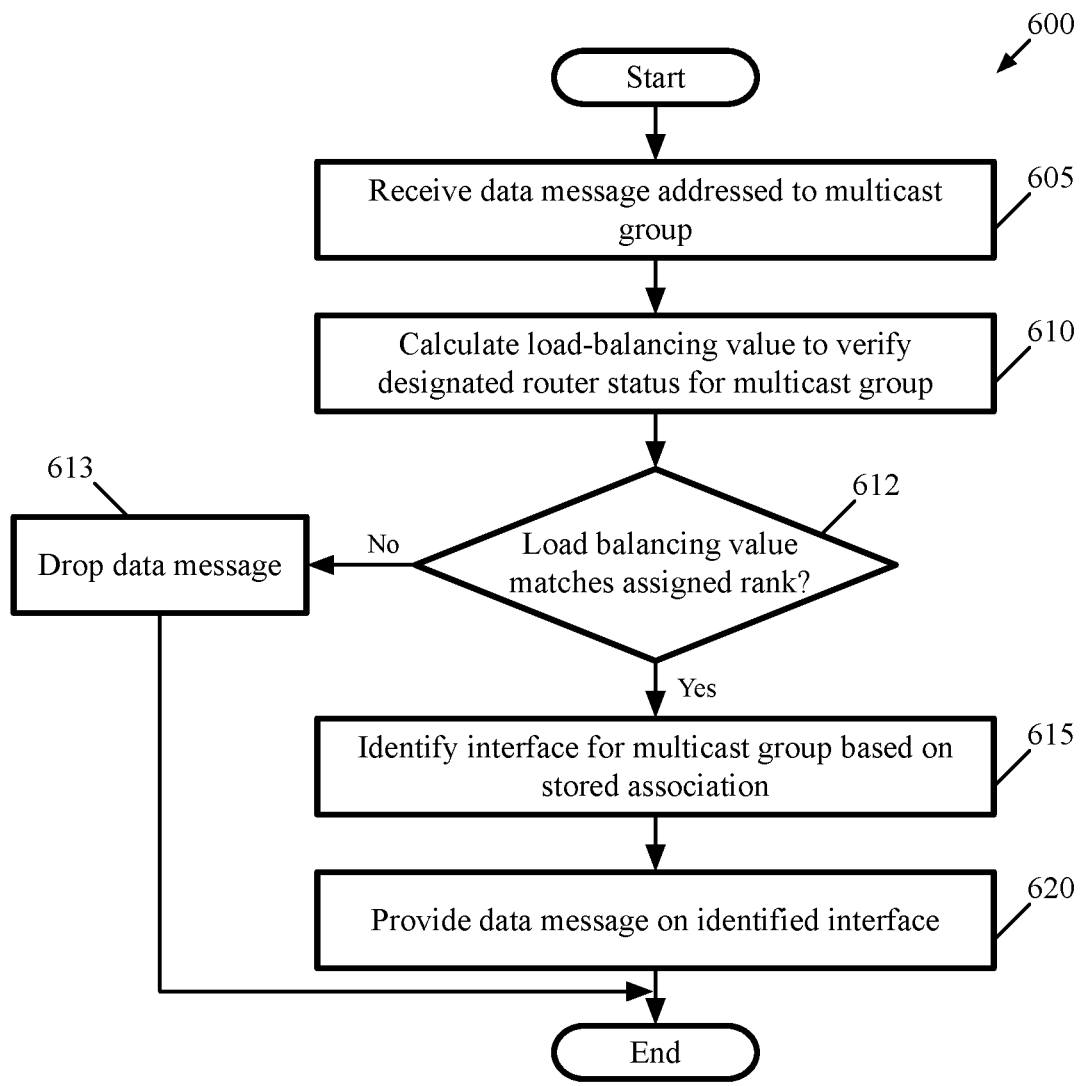
FIG. 6 conceptually illustrates a process performed by a designated router when it receives multicast traffic directed to the logical network.

FIG. 6 conceptually illustrates a process 600 performed in some embodiments by a designated router when it receives multicast traffic (e.g., from a rendezvous point or a data source) directed to the logical network. The process begins at 605 by receiving a data message addressed to the multicast group. The process 600 calculates (at 610) the load-balancing value in some embodiments using Equation (1), as a validation operation to verify that the SR is indeed the correct designated router for the multicast group to which the data message is addressed. At 612, the process determines whether the calculated load-balancing value matches the SR's assigned rank. If the calculated value does not match, then some other peer SR is the correct designated router for this multicast group. The process 600 proceeds to 613 and drops the data message. The process then ends.

The process 600 omits this operation in some embodiments. If the calculated load-balancing value does indeed match, or if the verification operations 610 and 612 are omitted, then the process 600 identifies (at 615) an interface associated with the multicast group to which the data message is addressed. This interface is identified in some embodiments by referencing a previously stored association between the multicast group (e.g., using a multicast group identifier) and the interface (e.g., using an interface identifier). The process 600 provides (at 620) the data message on the identified interface, towards the logical network. The process 600 then ends.

Figure 7:
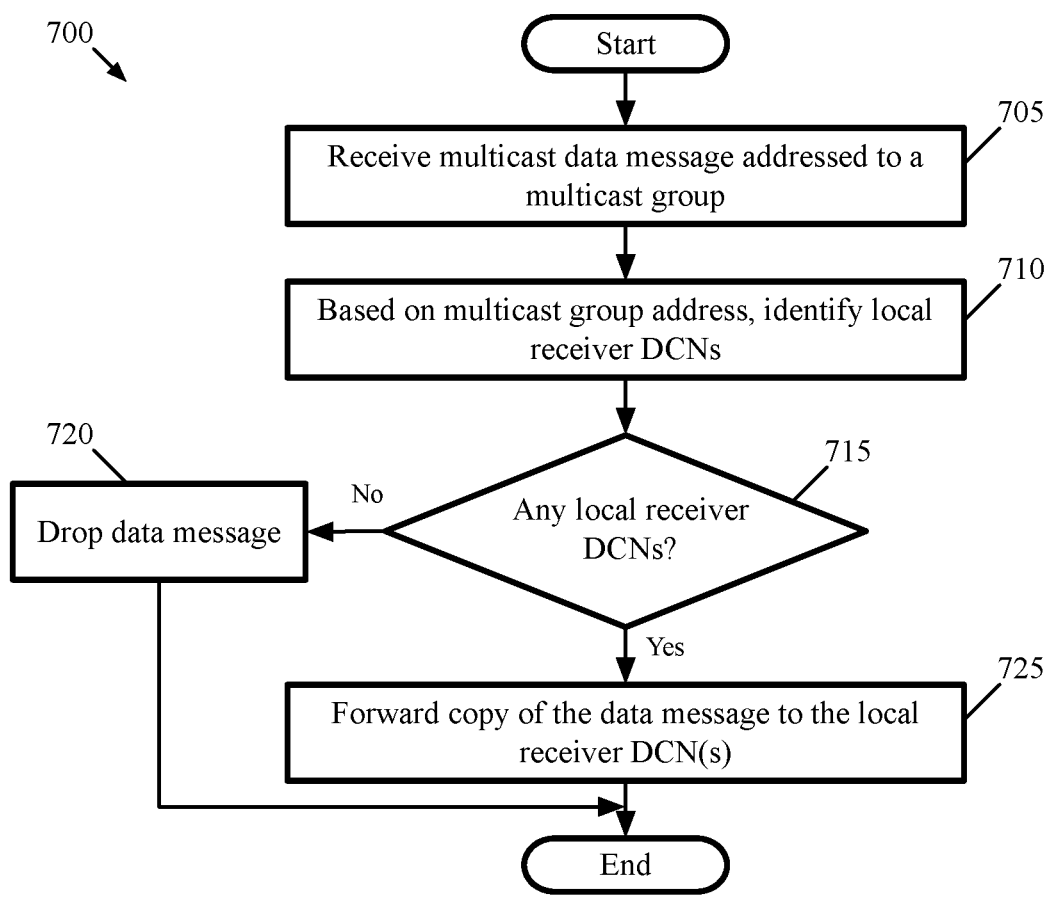
FIG. 7 conceptually illustrates a process for forwarding multicast data traffic received from a designated router to data compute nodes that have joined a multicast group.

FIG. 7 conceptually illustrates a process 700 for forwarding multicast data traffic received from a designated router to data compute nodes (DCNs) that have joined a multicast group. In some embodiments, the process 700 is performed by a forwarding element, such as a managed forwarding element (MFE) executing on a host computer that executes at least one logical endpoint (e.g., a DCN) for the logical network that needs to receive multicast traffic from the external network. In the example of FIG. 2, the process 700 is performed by an MFE 245 executing on host 225, that routes multicast traffic to and from DCN2 235.

The process 700 begins at 705 by receiving a multicast data message addressed to a multicast group (i.e., directed to the multicast address associated with the group). Using the multicast group address, the process 700 identifies (at 710) any local DCNs which are receivers for the multicast group. For example, if the process 700 is executed by an MFE on a host computer, the process identifies which DCNs executing on that host computer alongside the MFE are members of the multicast group. Some embodiments store associations between DCNs and the multicast groups based on previously received membership request messages from those DCNs. In some embodiments, multiple DCNs on the same or different host computers can join the same multicast group or different groups, one DCN can join multiple multicast groups (which may have the same or different designated routers), etc., and all of these associations are stored by the forwarding elements on their respective host computers.

If the process 700 determines (at 715) that there are no local receiver DCNs for the multicast group to which the received data message is addressed, the process 700 proceeds to operation 720 and drops the data message. The process 700 then ends. If the process 700 determines that there are local receiver DCNs for the multicast group, the process forwards (at 725) a copy of the data message to each of those local receiver DCNs. The process 700 then ends.

The SRs also use processes 300 and 700 in some embodiments to validate their role as designated routers for specific multicast groups in the event of a failover scenario, where the number of available candidate routers has changed. In some cases, the number of available candidate routers changes because a gateway has gone down, a new gateway has been added, and/or a gateway that had previously gone down has come back up. When one of the gateways goes down, so too does its SR, and all of the multicast groups for which the SR on the gateway was the designated router have to move to new designated routers. Based on new ranks assigned by the network management and control system, the forwarding elements on the host computers can reassign the designated router for multicast groups that were previously assigned to designated routers on any gateways that are no longer available, using the new ranks for any subsequent membership requests. In such scenarios, the load-balancing value must be recalculated in some embodiments by the hosts and/or the candidate routers to ensure that all of these network elements agree on how to redistribute the multicast traffic. Furthermore, the rank assigned to the candidate routers must be reassigned in some embodiments to ensure that the rank remains contiguous and properly indicates the updated number of available candidate routers.

In some embodiments, when the number of currently available candidate routers changes, each of the designated routers also perform the recalculation to determine whether it remains the designated router for the assigned multicast groups or has been assigned as the designated router for any other multicast groups. Each designated router then sends additional join request messages or cancel request messages to the appropriate rendezvous points associated with the affected multicast groups as needed based on these determinations.

Figure 8:
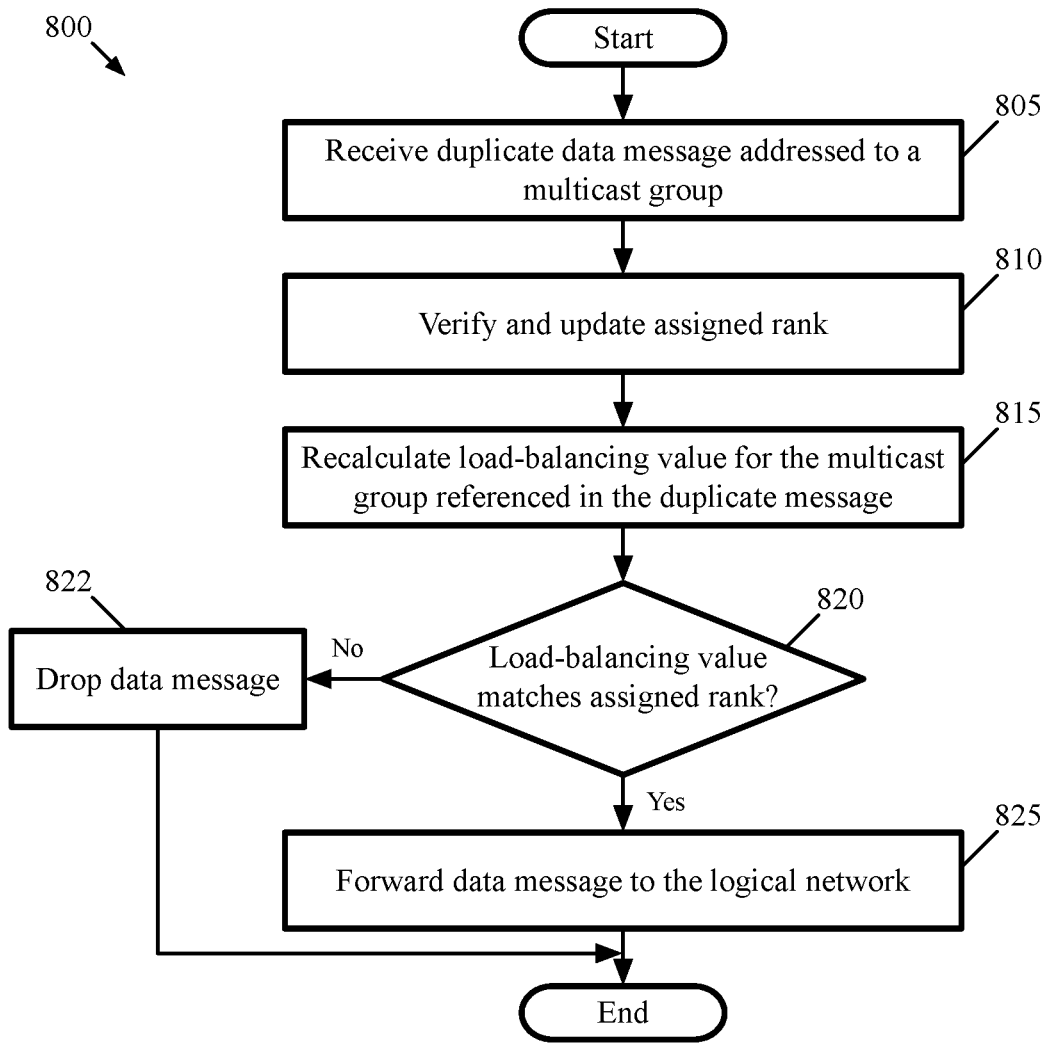
FIG. 8 conceptually illustrates a process performed by a designated router after another designated router comes back online after failure.

If a scenario where a gateway previously executing the designated router for a multicast group fails and then comes back online, there is a possibility of two candidate routers acting as designated router for the same multicast group. If this happens, multicast traffic is duplicated, potentially wasting bandwidth and causing lost traffic. FIG. 8 conceptually illustrates a process 800 performed by a designated router after another designated router comes back online after failure. For example, in the network shown in FIG. 2, the process 800 is performed by SR C 219 for multicast group 225.1.1.1, after the gateway 210 hosting SR B 218 fails and then comes back online.

The process 800 begins at 805 by receiving a duplicate data message addressed to a multicast group for which the SR is the designated router. In other words, the SR executing process 800 receives traffic addressed to the multicast group from the RP 260 and/or the external host 250 as usual, but also receives copies of that multicast traffic from a peer SR on another gateway. This indicates that the peer SR also considers itself to be a designated router for the same multicast group. The data message is received in some embodiments on the same interface that the SR uses to send multicast traffic to the logical network.

At 810, the process 800 verifies its assigned rank, and updates the rank if necessary. In some embodiments, the process 800 periodically receives an updated rank from the network management and control system. In other embodiments, the process 800 requests an updated rank based on receiving the duplicate data message, or determines the rank itself.

The process 800 recalculates (at 815) the load-balancing value for the multicast group using the multicast address and the number N of currently available candidate routers. In some embodiments, the process 800 uses Equation (1) to recalculate the load-balancing value. As noted above, the process 800 determines N from locally-stored state information, information provided by the network management and control system, or both.

At 820, the process determines whether the recalculated load-balancing value matches the updated or verified assigned rank. If the recalculated value does not match, then the other peer SR is the correct designated router for this multicast group. The process 800 proceeds to 822 and drops the duplicate data message. In some embodiments, the process 800 also updates any stored or cached associations between itself and the multicast group, so that process 800 does not need to be performed again upon receiving another data message addressed to the same multicast group. The process 800 also sends a cancel request to the RP in some embodiments to ensure that further data messages are not received from the RP for this multicast group. The process 800 then ends.

If the process 800 determines that the recalculated load-balancing value does match its verified or updated rank, then it remains the designated router for the multicast group. The process 800 forwards (at 825) the data message to the logical network. The process 800 then ends. Since the peer SR is also receiving duplicate data messages for the multicast group from the same RP and/or source host, the peer SR is also performing process 800, and will come to the opposite result, dropping the data message.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples above refer to data packets, packets, data messages, or messages, it should be understood that the invention should not be limited to any specific format or type of data message. Further, the terms end machine and virtual machine (VM) are used herein to refer to any instance of a data compute node (DCN) that operates in virtualization software, including VMs and containers that execute within VMs.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
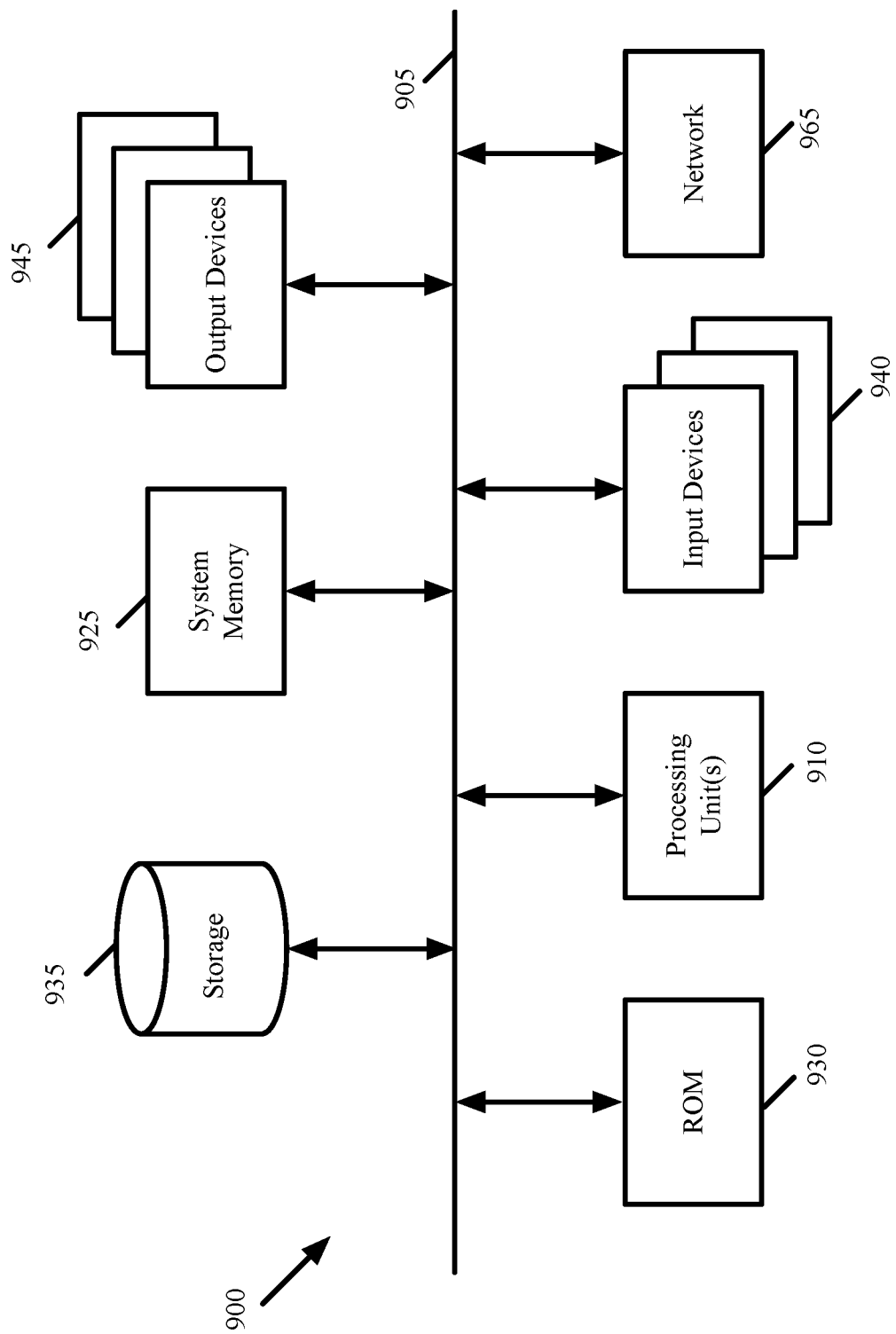
FIG. 9 conceptually illustrates an electronic system with which some embodiments of the invention are implemented.

FIG. 9 conceptually illustrates an electronic system 900 with which some embodiments of the invention are implemented. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieve instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such as random-access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieve instructions to execute and data to process in order to execute the processes of some embodiments.

The bus 905 also connects to the input and output devices 940 and 945. The input devices 940 enable the user to communicate information and select commands to the electronic system 900. The input devices 940 include alphanumeric keyboards and pointing devices (also called "cursor control devices"). The output devices 945 display images generated by the electronic system 900. The output devices 945 include printers and display devices, such as cathode ray tubes (CRT) or liquid crystal displays (LCD). Some embodiments include devices such as a touchscreen that function as both input and output devices.

Finally, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for identifying a designated router for a multicast group, the method comprising:

at a forwarding element executing on a host computer that also executes a set of data compute nodes (DCNs) that are sources and destinations of data messages:

receiving a membership request message to join the multicast group from a particular DCN of the set of DCNs executing on the host computer, wherein the particular DCN connects to a logical network implemented in a datacenter, said membership request message comprising an address associated with the multicast group;

identifying a logical router gateway from a set of logical router gateways as the designated router for the multicast group based at least in part on the address associated with the multicast group, the logical router gateways for handling data messages between the logical network in the datacenter and external networks, wherein different logical router gateways from the set of logical router gateways are assigned as designated routers for different multicast groups with different associated addresses; and forwarding the membership request message to the identified logical router gateway, wherein the identified logical router gateway sends a join message to a router in the external networks requesting to join the multicast group.

2. The method of claim 1 further comprising, at the forwarding element executing on the host computer:

receiving a data message directed to the address associated with the multicast group from the identified logical router gateway; and forwarding the received data message to the particular DCN.

3. The method of claim 2 further comprising, storing an association between the particular DCN and the multicast group based on the membership request message, wherein the data message is forwarded to the particular DCN based on the stored association.

4. The method of claim 1, wherein the membership request message is a first membership request message, the multicast group is a first multicast group, the address is a first address, the join message is a first join message, and the identified logical router gateway is a first logical router gateway, the method further comprising:

receiving a second membership request message to join a second multicast group, said membership request message comprising a second address associated with the second multicast group;

identifying a second logical router gateway from the set of logical router gateways as the designated router for the second multicast group based at least in part on the second address; and forwarding the second membership request message to the second logical router gateway, wherein the second logical router gateway sends a second join message to a second router in the external networks requesting to join the second multicast group.

5. The method of claim 4, wherein the particular DCN is a first DCN, wherein the second membership request message is received from a second DCN of the set of DCNs, the second DCN also connected to the logical network.

6. The method of claim 4, wherein the second membership request message is also received from the particular DCN.

7. The method of claim 1, wherein each of the logical router gateways is assigned a different rank, wherein identifying the logical router gateway as the designated router for the multicast group comprises:

calculating a value based on the address associated with the multicast group; and identifying the logical router gateway with the assigned rank equal to the calculated value as the designated router for the multicast group.

8. The method of claim 1, wherein calculating the value comprises computing a portion of the address modulo a number of logical router gateways currently available to receive data messages in the set of logical router gateways.

9. The method of claim 8, further comprising:
determining that the identified logical router gateway is no longer available to receive data messages;
identifying a different one of the logical router gateways from the set of logical router gateways by (i) recalculating the value as the portion of the address modulo a modified number of logical router gateways currently available to receive data messages in the set of logical router gateways and (ii) identifying the logical router gateway with the assigned rank equal to the recalculated value.

10. The method of claim 1, wherein prior to sending the join message, the identified logical router gateway verifies that the identified logical router gateway is the correct logical router gateway to be the designated router for the multicast group based on the address associated with the multicast group.

11. The method of claim 1, wherein the identified logical router gateway receives the membership request message on a particular interface and stores an association of the multicast group with the particular interface.

12. The method of claim 11, wherein the identified logical router gateway uses the stored association to forward data messages for the multicast group to the forwarding element on the host computer.

13. A non-transitory machine readable medium storing a program forwarding element for execution by at least one processing unit of a host computer on which a set of data compute nodes (DCNs) execute, wherein the DCNs are sources and destinations of data messages, the forwarding element for identifying a designated router for a multicast group, the forwarding element comprising sets of instructions for:
receiving a membership request message to join the multicast group from a particular DCN of the set of DCNs executing on the host computer, wherein the particular DCN connects to a logical network implemented in a datacenter, said membership request message comprising an address associated with the multicast group;
identifying a logical router gateway from a set of logical router gateways as the designated router for the multicast group based at least in part on the address associated with the multicast group, the logical router gateways for handling data messages between the logical network in the datacenter and external networks, wherein different logical router gateways from the set of logical router gateways are assigned as designated routers for different multicast groups with different associated addresses; and
forwarding the membership request message to the identified logical router gateway, wherein the identified logical router gateway sends a join message to a router in the external networks requesting to join the multicast group.

14. The non-transitory machine readable medium of claim 13, the forwarding element further comprising sets of instructions for:
receiving a data message directed to the address associated with the multicast group from the identified logical router gateway;
forwarding the received data message to the particular DCN; and
storing an association between the particular DCN and the multicast group based on the membership request message, wherein the data message is forwarded to the particular DCN based on the stored association.

15. The non-transitory machine readable medium of claim 13, wherein the membership request message is a first membership request message, the multicast group is a first multicast group, the address is a first address, the join message is a first join message, and the identified logical router gateway is a first logical router gateway, the forwarding element further comprising sets of instructions for:
receiving a second membership request message to join a second multicast group, said membership request message comprising a second address associated with the second multicast group;
identifying a second logical router gateway from the set of logical router gateways as the designated router for the second multicast group based at least in part on the second address; and
forwarding the second membership request message to the second logical router gateway, wherein the second logical router gateway sends a second join message to a second router in the external networks requesting to join the second multicast group.

16. The non-transitory machine readable medium of claim 15, wherein the particular DCN is a first DCN, wherein the second membership request message is received from a second DCN of the set of DCNs, the second DCN also connected to the logical network.

17. The non-transitory machine readable medium of claim 15, wherein the second membership request message is also received from the particular DCN.

18. The non-transitory machine readable medium of claim 13, wherein each of the logical router gateways is assigned a different rank, wherein the set of instructions for identifying the logical router gateway as the designated router for the multicast group comprises sets of instructions for:
calculating a value based on the address associated with the multicast group; and
identifying the logical router gateway with the assigned rank equal to the calculated value as the designated router for the multicast group.

19. The non-transitory machine readable medium of claim 13, wherein the set of instructions for calculating the value comprises a set of instructions for computing a portion of the address modulo a number of logical router gateways currently available to receive data messages in the set of logical router gateways, the program further comprising sets of instructions for:
determining that the identified logical router gateway is no longer available to receive data messages;
identifying a different one of the logical router gateways from the set of logical router gateways by (i) recalculating the value as the portion of the address modulo a modified number of logical router gateways currently available to receive data messages in the set of logical router gateways and (ii) identifying the logical router gateway with the assigned rank equal to the recalculated value.

* * * * *